United States Patent [19]

Brandao et al.

[11] 3,803,600
[45] Apr. 9, 1974

[54] DIGITAL SWEEP GENERATOR IN VIDEO STORAGE DEVICE FOR A DATA DISPLAY SYSTEM

[75] Inventors: Roy Lopes Brandao; Robert Arnold Taylor, Jr., both of Fort Lauderdale, Fla.

[73] Assignee: The Bendix Corporation, Southfield, Mich.

[22] Filed: Feb. 16, 1972

[21] Appl. No.: 226,899

[52] U.S. Cl. ............................................. 343/5 DP
[51] Int. Cl. ............................................. G01s 9/02
[58] Field of Search .................. 343/5 DP, 55 C, 17

[56] References Cited
UNITED STATES PATENTS
3,633,173 1/1972 Edge ............................. 343/5 DP X
3,623,089 11/1971 Bossert ............................ 343/5 DP
3,683,373 8/1972 Barnes et al. ..................... 343/5 DP
3,353,177 11/1967 Wilmot ............................ 343/5 DP
3,680,088 7/1972 Bryant ............................ 343/5 DP
3,617,719 11/1971 Wong ........................... 343/5 DP X

*Primary Examiner*—Malcolm F. Hubler

[57] ABSTRACT

Radar return signals are digitized and the resultant bits entered serially into an input buffer in the form of a storage register. The bits are integrated on a bit-by-bit basis and then entered into the main memory in the form of a circulating storage register. The information stored in the main memory is subsequently recalled and conveyed through an output buffer for display on a cathode ray tube. The rate at which the bits of each word are entered into the input buffer determines the display range. In addition, the rate at which bits are entered into the input buffer may differ from the rate at which bits are displayed on the cathode ray tube.

21 Claims, 9 Drawing Figures

DIGITAL SWEEP GENERATOR IN VIDEO STORAGE DEVICE FOR A DATA DISPLAY SYSTEM

BACKGROUND OF THE INVENTION

This invention relates to data display systems and more particularly to radar indicators and video storage devices therefor of the type wherein data is received at a relatively low rate and displayed at a different rate, generally many times faster, to obtain a relatively non-flickering, steady, high resolution image. The invention has particular application in weather radar systems and radar navigation systems.

It has long been a desirable feature that the indicator for the above type radars provide a continuous bright display of video information which will appear as a moving map to the pilot. This desirable feature has been closely approximated in the past by storage tube indicators. Storage tubes, however, require careful design for stable operation. The small spacing and relatively high voltage existing between the storage mesh and the viewing phosphor are vulnerable to breakdown. Operation of the tube must be controlled to prevent a bistable condition on the storage surface. In this condition, excessive beam righting can shift the storage mesh potential sufficiently to result in secondary emission, causing a runaway condition and resulting destruction of the viewing screen mesh.

Scan conversion systems have also been used to provide the continuous bright display of video information. In scan conversion, the display is normally written into a normal radar scan such as a PPI and is readout in a different scan such as a TV raster.

SUMMARY OF THE INVENTION

The development of MOS (metal oxide silicone) integrated circuits has made it possible to store large amounts of information in a small package at a low cost with very little power consumption per package. This information can be stored and readout at extremely high rates. In the invention to be described a MOS integrated circuit operates as a circulating memory to store digitized video radar return signals. An input buffer is provided for temporarily storing the digitized video signals from the radar receiver prior to their entry into the circulating memory. The use of an input buffer permits the rate at which digitized radar return signals are entered into the memory to be varied. The memorized bits may now optionally be integrated to eliminate extraneous signals, such as those caused by noise or other interference and entered into a second memory or may be used to drive the cathode ray tube. In any event, an output buffer is provided between the first memory and the cathode ray tube if no integration is provided and between the second memory and the cathode ray tube if integration is provided. The output buffer permits selected portions of the memorized bits to be displayed in an ordered sequence on the cathode ray tube at a rate which may differ from the rate at which bits were entered into the input buffer. This method of sweep generation and storage permits the quality of the display to be independent of the pulse repetition frequency of the system. Therefore, a minimum pulse repetition frequency can optionally be used and still retain a relatively bright, continuous display. As a result, the average power consumed by bhe transmitter portion of the system can be less than that required by systems having a higher pulse repetition frequency.

In addition to the above described elements an azimuth memory is provided. This memory is updated at the pulse repetition frequency. The information stored in the azimuth memory is used to synchronize the operation of the input and output buffers and their associated gates and in addition, in the embodiment to be shown, is used to position the radar antenna.

Note also that in the system to be described herein there is no transformation of the coordinate system. The input data from the radar receiver is in the $(R,\theta)$ coordinate system and the resulting display is also in the $(R,\theta)$ coordinate system. However, the rates of input and output data are optimally independent. By maintaining the same coordinate system, data can be stored and read out in the same sequence, avoiding complicated information retrieval associated with digital X-Y scan conversion techniques.

It is thus an object of this invention to provide a radar indicator which employs digital techniques for video storage and for controlling sweep to sweep generation.

It is another object of this invention to provide a data display system for a radar which will supply a continuous bright display of video information.

It is still a further object of this invention to provide the radar indicator of the type described which is particularly advantageous for use with airborne weather radars and navigation radars.

One more object of this invention is to provide a digital radar indicator for use with a radar which operates with reduced power consumption.

DESCRIPTION OF THE PREFERRED EMBODIMENT

For purposes of illustraton the present invention will be described as it may be used in a weather radar system suitable for use by aircraft. However, it should be obvious that the invention is suitable for other uses in other environments.

In this description a word, binary word or digital word is defined as a serial train of binary bits which comprise one range line of information. All words are the same length and in particular are made 128 bits in length. This convenient length allows the economical use of commercially available MOS integrated circuits. Each memory to be described includes storage for an integral number of words.

Figure 1:
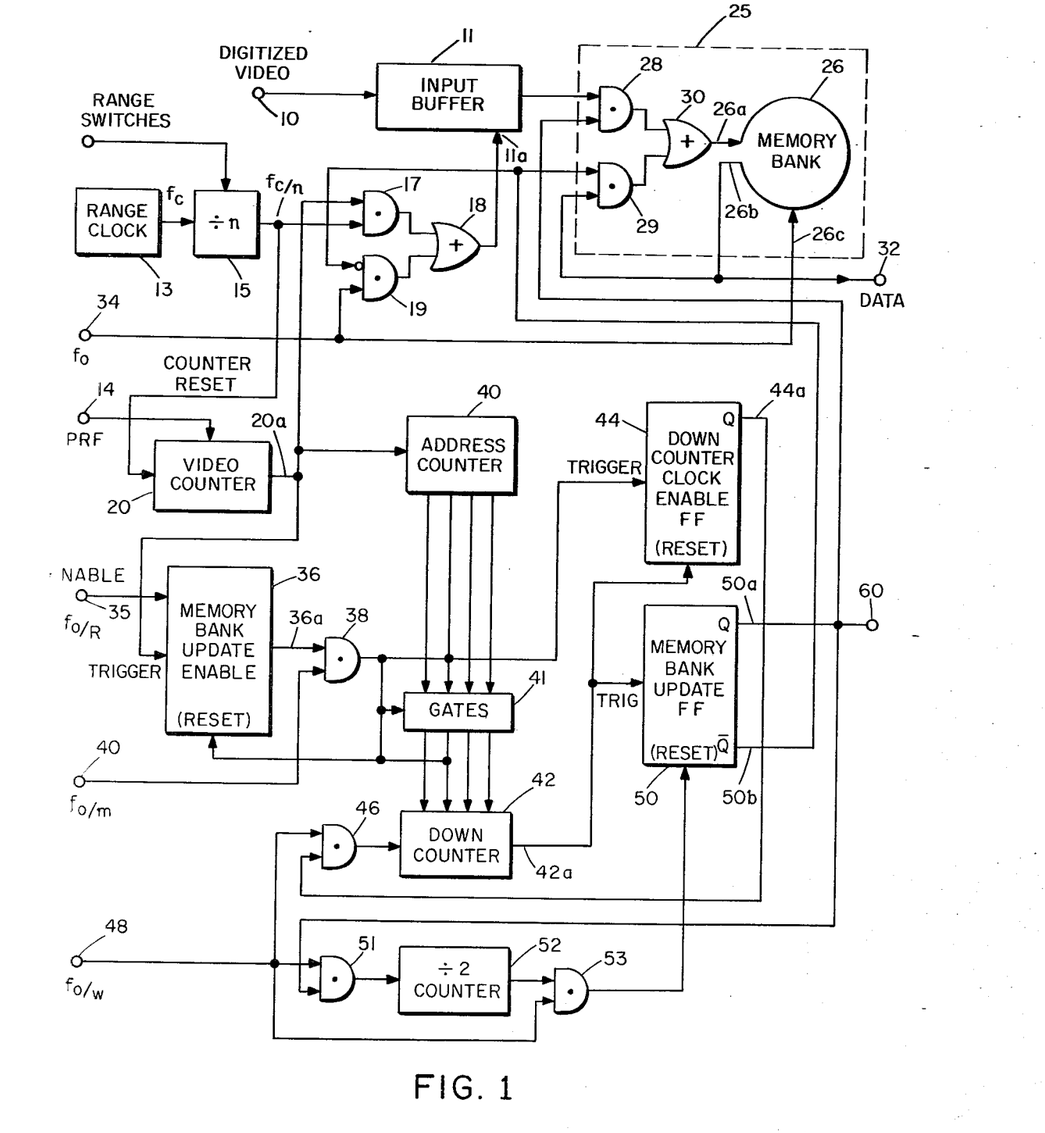
FIG. 1 is a block diagram illustrating the input section of the invention.

Referring to the figures wherein like numbers refer to identical items, and more particularly referring to FIG. 1, there is seen an input terminal 10 upon which digitized video data is impressed. The means for digitizing video data are well known to those skilled in the art and need not be described at this time. The video comprises the radar return intercepted by a radar receiver. The digitized video signal is suitably impressed on terminal 10 at the same rate the radar return is intercepted by the radar receiver. The digitized video is applied to an input buffer 11. The input buffer is comprised of two 128 bit shift registers and thus is capable of receiving and storing therein two binary words. The digitized video is clocked into the input buffer by clock pulses applied to terminal 11a.

Clock pulses having a repetition frequency of $f_c$ are supplied by range clock 13 to a divide-by-n counter 15 which in response thereto supplies clock pulses at a repetition frequency of $f_c/n$. These latter clock pulses are applied through AND gate 17, if opened, and OR gate 18 to terminal 11a to strobe the digitized video on terminal 10 into the input buffer 11. The clock pulses at $f_c/n$ are also applied to a video counter 20 which generates an output signal on line 20a so long as counter 20 is not filled. Counter 20 fills after it has accumulated the number of clock pulses equal to the number of bits in a word, that is, the counter has a capacity of accumulating 128 counts. In addition, counter 20 is reset at the pulse repetition frequency (PRF) of the radar with which this indicator system is used and at the time the radar transmitter transmits a pulse. Thus, video counter 20 is reset to a zero count so that it generates an output on line 20a to qualify AND gate 17 simultaneously with the expected arrival of the first digitized video at terminal 10 corresponding to the radar return from this particular transmission. Thus, since the same pulse train is applied simultaneously to video counter 20 and to AND gate 17 exactly 128 clock pulses at repetition frequency $f_c/n$ will pass through the AND gate and OR gate 18 onto terminal 11a to thus enter exactly one binary word into input buffer 11.

The factor $n$ of divider 15 is varied by manipulation of range switches, not shown, to thus change the rate at which the input buffer is strobed. Since the digitized video arriving at terminal 10 arrived at the rate the radar receiver intercepts the radar return it should be now obvious that the frequency of the clock pulses at terminal 11a determines the range at which each individual bit of a word is entered into the input buffer.

A first circulating memory is comprised of a memory bank 26, AND gates 28 and 29 and OR gate 30. Memory bank 26 has the capacity to store therein an integral number of 128 bit words and thus comprises the required number of MOS integrated circuit dynamic shift registers. In this particular embodiment memory bank 26 has the capacity to store 1,024 bits, that is, eight words of 128 bits each. Of course, the capacity of this memory bank is a design option as will become obvious as the description proceeds. Binary information enters the memory bank 26 at a terminal 26a and exits from the memory bank at terminal 26b. The rates at which the binary bits circulate within the memory bank is determined in the manner well known to those skilled in the art by rate at which clock pulses are applied to terminal 26c. These clock pulses are supplied at a pulse repetition frequency of $f_o$ from a source which will be shown later. If AND gate 29 is qualified, the binary bits exiting from the memory bank at terminal 26b are immediately entered through gate 29 and gate 30 back into the memory bank at terminal 26a thus providing continuous storage within the memory bank so long as the pulses $f_o$ are supplied thereto. The memory bank information is also available at data terminal 32 as it exits at terminal 26b. Memory 25 may be updated by closing gate 29 and qualifying gate 28 and simultaneously strobing the information from input buffer 11 through gates 28 and 30 onto terminal 26a. Of course, when memory 25 is to be updated, pulses $f_o$ rather than $f_c/n$ must be supplied at input buffer terminal 11a so that the binary data stored therein may be entered into memory bank 26 at the same rate the bits within the memory bank are circulating.

In the embodiment shown, two consecutive digitized video words comprising two consecutive range lines are entered into input buffer 11 and then immediately transferred into memory bank 26. In an indicator actually built, frequency $f_o$ was 828 KHz. Since 256 clock pulses at terminal 11a are required to enter the two words temporarily stored therein into memory bank 26, it can be seen that this operation requires approximately one third of a millisecond. As previously discussed, the time required to store the digitized video at terminal 10 into input buffer 11 is directly related to the distance selected for viewing. For example, the time to store the data for a one hundred mile range display would be approximately 1.2 milliseconds. The frequency $f_c/n$ would thus be 128 bits divided by 1.2 milliseconds or 106 KHz. In like manner, the time to store the data for a 50 mile range display would be approximately 0.6 milliseconds. Thus, assuming that a 100 mile range display is the maximum range to be handled by this unit and assuming further that the pulse repetition frequency of the radar transmitter is a 100 per second, or a period of 10 milliseconds, it can be seen that there is sufficient time after the storage of a particular word into the input buffer for both words temporarily stored therein to be subsequently transferred to memory bank 26 before the next transmitter pulse occurs.

The updating of memory bank 26 is accomplished as follows. There is impressed upon terminal 35 a square wave, $f_o/R$, synchronized with the pulse repetition frequency of the radar transmitter such that two transmitter pulses are generated during one period of the square wave. The high portion of the square wave enables the memory bank update enable flip flop 36. This flip flop is triggered by the negative going transitions from video counter 20. Hence, at the termination of the second word stored into the input buffer 11 flip flop 36 is triggered so that an output signal appears on terminal 36a to qualify AND gate 38. With gate 38 now qualified, the signal $f_o/m$ at terminal 40, where $m$ is equal to the number of bits in memory bank 26 and which is generated by a source to be described, may pass therethrough to gate 41 to gate the contents of address counter 40 into down counter 42. In addition, the signal from gate 38 also sets down counter clock enable flip flop 44 so that a signal is generated at terminal 44a which is used to qualify AND gate 46. The signal from gate 38 is also used to reset flip flop 36 thus closing gate 38. A terminal 48 has the signal $f_o/w$, where $w$ is the number of bits in a word, impressed thereon, which frequency signal now passes through qualified gate 46 to clock down counter 42.

Address counter 40 whose contents have been entered into down counter 42, accumulates the negative going transitions from video counter 20 and hence contains a number equal to the memory bank word location for the words received by input buffer 11. For the correct operation of the embodiment being described, address counter 40 should be a divider which divides by a number C where C is equal to the word storage capacity of memory bank 26 less the number of words entered therein each time the memory bank is updated. Since in the embodiment two words are entered from the input buffer into the memory bank each time the memory bank is updated and the capacity of the memory bank is eight words, then C=8−2=6.

When down counter 42 is clocked down to zero it generates an output on line 42a which resets flip flop 44 to extinguish the signal on line 44a to thus close gate 46. In addition, the signal on line 42a sets the memory bank update flip flop 50 which as a result generates a signal at port 50a and extinguishes the signal at 50b. Port 50a communicates with gate 28 thus qualifying that gate. Port 50b communicates with an inhibiting port on gate 19 and with gate 29. Accordingly, gate 19 is opened and gate 29 is closed. The clock pulses $f_o$ from terminal 34 now pass through gates 19 and 18 to terminal 11a of input buffer 11 to thus clock the binary words stored therein through now qualified gate 28 and gate 30 into memory bank 26. At the same time, since gate 29 is now closed, two words previously stored in the memory bank and issuing at terminal 26b are extinguished. The pulses $f_o/w$ at terminal 48, which it will be remembered occur once in every 128 of the $f_o$ pulses, are applied to a divide by two counter 52 which is now qualified by the signal at terminal 50a. At the conclusion of the second $f_o/w$ pulse following the setting of flip flop 50 counter 52 generates an output which qualifies gate 53 to thus reset flip flop 50. This action causes the flip flop to generate a signal at port 50b and to extinguish the signal at port 50a. Thus, exactly two binary words will be strobed from input buffer 11 into the memory bank at the completion of which gate 19 will close and gate 29 will open. In this condition, the information stored in memory bank 26 will continue to circulate therein and will be preserved.

Figure 2:
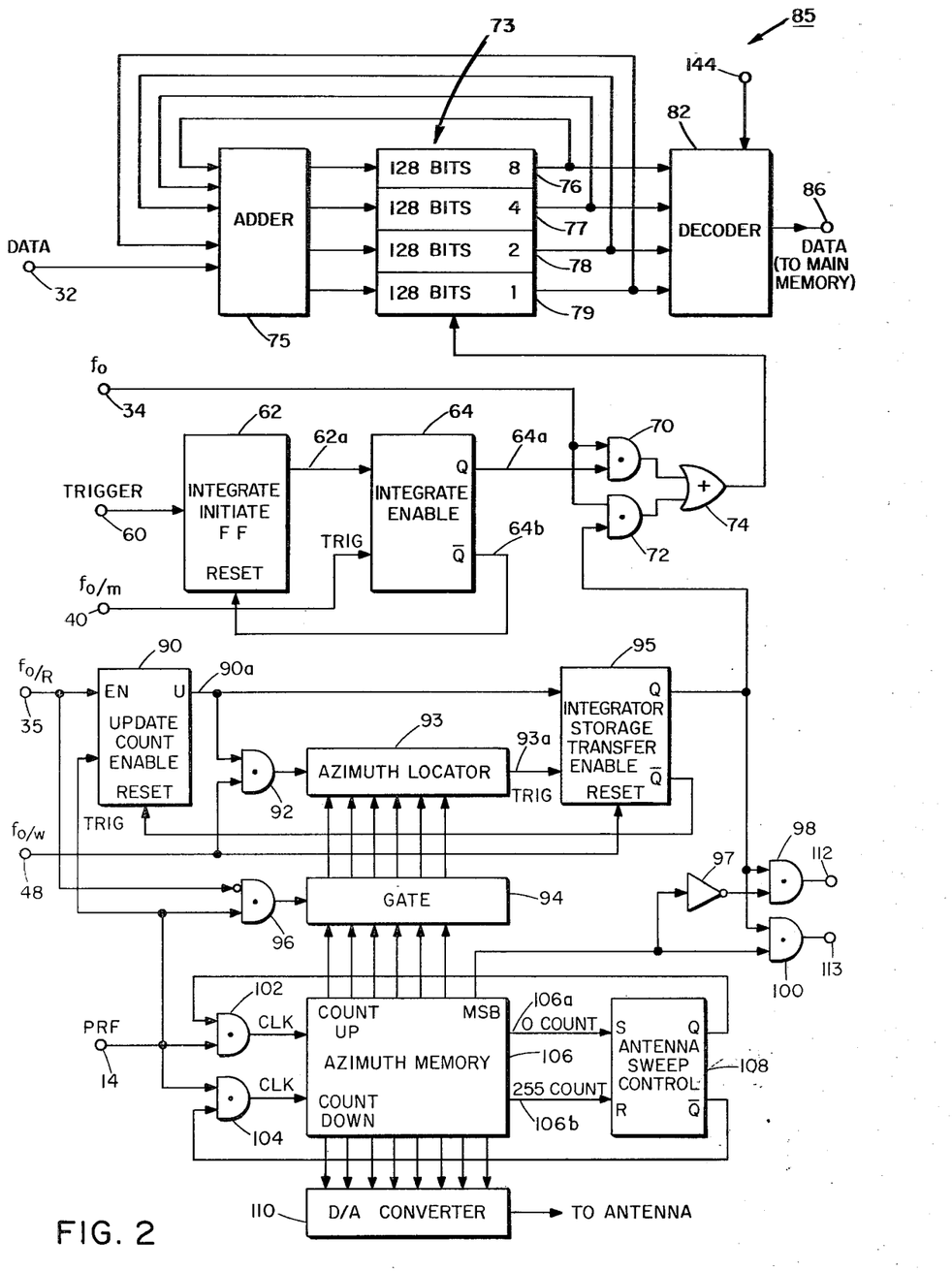
FIG. 2 is a block diagram illustrating the integrator and associated elements.

Refer now to FIG. 2 wherein terminal 60, also seen in FIG. 1, communicates with the toggle terminal of integrate initiate flip flop 62. It will be remembered that a signal appears at terminal 60 at the beginning of the updating of memory bank 26. The trailing edge of this signal at the conclusion of the updates of memory bank 26 sets flip flop 62 so that a signal appears at the output 62a thereof which is applied to the set terminal of flip flop 64. The toggle terminal of this latter flip flop is connected to terminal 40, upon which it will be remembered the frequency signal $f_o/m$ is impressed. Thus, upon appearance of a pulse from this signal, flip flop 64 goes to the set state to generate a signal at terminal 64a and to extinguish the signal at terminal 64b. The signal at terminal 64a qualifies AND gate 70 thus permitting the signal $f_o$ at terminal 34 to pass therethrough and through OR gate 74 to the integrator storage registers 73 which are comprised of shift registers 76, 77, 78 and 79. The integrator storage registers 73 together with adder 75 and decoder 82 comprise an integrator which tends to eliminate extraneous bits in memory bank 26 from being passed on to a main memory as will be described below.

It will be shown below that all the bits stored in the memory bank 26 will be examined on a bit-by-bit basis to produce a single word for entry into a main memory to be described. For example, the integrator examines the first bit of each word stored in the memory bank and enters a digital number in the integrator storage registers 73 corresponding to the number of times the first bit of each word stored in the memory bank was of a predetermined logic such as logic "1." In like manner the integrator examines the subsequent bits of each word stored in the memory bank and enters a corresponding digital number in integrator storage registers 73.

In the embodiment being described it is assumed that eight words are stored in the memory bank, that is, memory nank 26 has a capacity of storing 1,024 binary bits. Integrator storage registers 73 must have the capacity of storing a digital number corresponding to decimal 8 for each bit position in a word. Thus, the integrator storage resistors 73 suitably consist of 4 shift registers each of which has a capacity of 128 bits. During this integration period exactly 1,024 clock pulses are supplied by gate 74 to the storage registers 73 since gate 70 is opened when flip flop 64 is toggled by the signal at terminal 40 and gate 70 is subsequently closed when the flip flop 64 is again toggled by the signal at terminal 40 where the signal at terminal 40, it will be remembered, occurs once each time the bits in memory bank 26 have been completely circulated, or once very 1,024 pulses of signal $f_o$. Of course, during the time that storage registers 73 are being filled from the memory bank the decoder 82, whose operation will be described below, is effective to transfer data to data terminal 86. However, referring to FIG. 3 wherein data terminal 86 is again seen, since at this time gates 125 and 134 are closed, the data now appearing on terminal 86 is ineffective.

Figure 9:
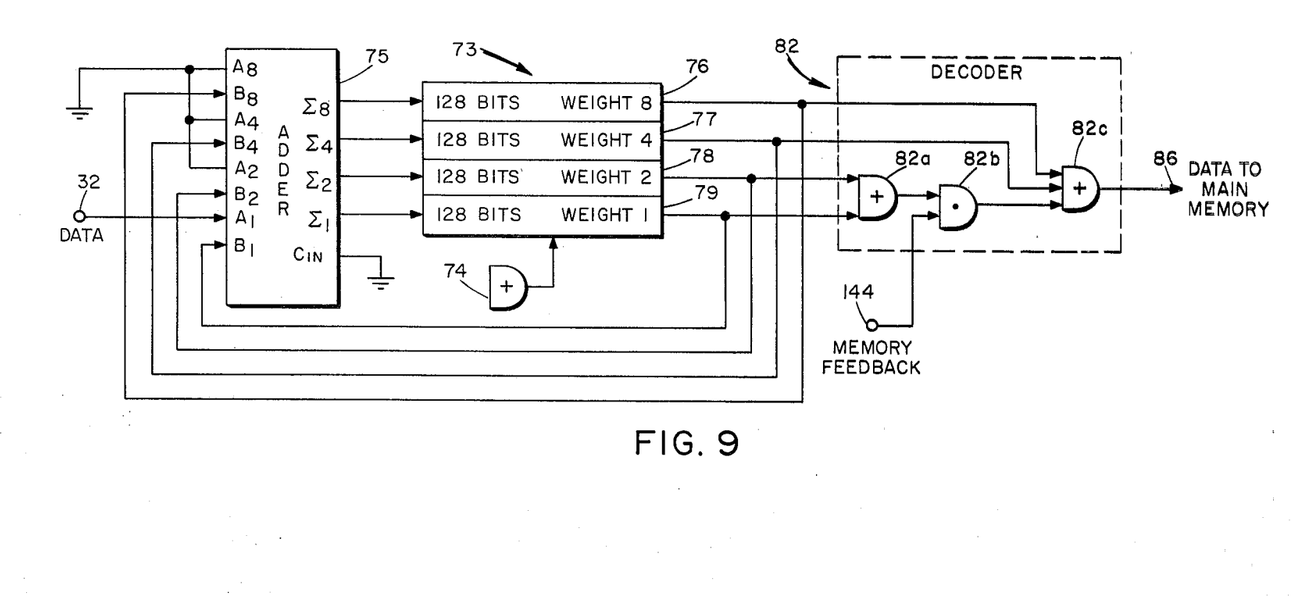
FIG. 9 is a block diagram which shows the integrator and decoder in greater detail.

Reference should now be made to FIG. 9 where the integrator is seen in greater detail. As discussed earlier, the data appearing at terminal 86 is ineffective during the integration period hence the operation of decoder 82 will not be discussed at this time. During the integration period clock pulses are applied to the integrator storage registers 73 from gate 74 as earlier explained while simultaneously data bits are received from the memory bank on input terminal 32 which in turn is connected to terminal $A_1$ of adder 75. At the beginning of the integration period the integrator shift registers are empty as will be explained below. The output from shift register 79 is applied to adder terminal $B_1$. The adder sums the bits at terminals $A_1$ and $B_1$ and enters the result in the register having a weight of 1, that is, into register 79. Generally, the adder performs the function of adding the bits at terminal $A_n$ and $B_n$ and entering the result into the register having a weight of $n$ where $n = 1, 2, 4$ or 8 in accordance with the following: general:

$A_n + B_n +$ Carry $n-1 = \Sigma_n +$ Carry $n$
$A_1 + B_1 + C_{in} = \Sigma_1 +$ Carry 1
where $C_{in} = 0$
$A_2 + B_2 +$ Carry $1 = \Sigma_2 +$ Carry 2
where $A_2 = 0$
$A_4 + B_4 +$ Carry $2 = \Sigma_4 +$ Carry 4
where $A_4 = 0$
$A_8 + B_8 +$ Carry $4 = \Sigma_8 +$ Carry 8
where $A_8 = 0$ Refer back to FIG. 3 where there is seen a main memory comprised of portions 130 and 138. In the embodiment shown each portion of the main memory includes capacity for storing 8,192 bits for a total of 16,384 bits in both portions. This is equivalent to 128

Figure 3:
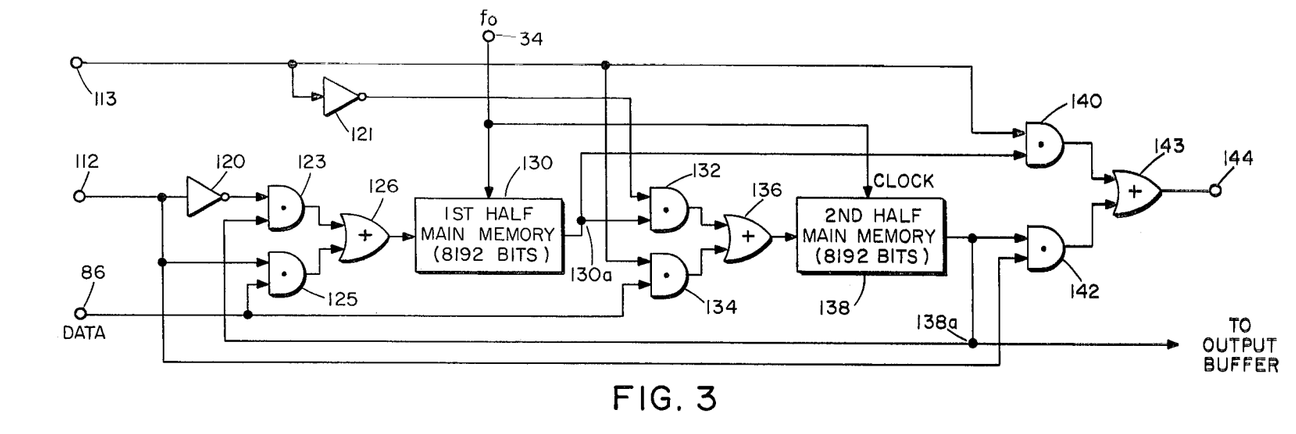
FIG. 3 is a block diagram illustrating the main memory and associated gates.

128-bit words. The main memory, like memory bank 26 previously described, is a circulating shift register which, being dynamic, requires continuous clocking to maintain the data. The main advantages of this type of memory for this application is that by providing a scan referance and a line reference for the CRT displays, to be described, no need for addressing exists. The data is fed from the main memory in serial fashion to the display through an output buffer, also to be described, with no control required other than the line and scan resets.

A double or two-port entry system is required because of the update requirements, hence the main memory is split into the two portions as shown, with the gates 123, 125 and 126 providing access to the first section 130 of the memory and gates 132, 134 and 136 providing access to the second portion 138 of the memory. In this embodiment approximately 20 milliseconds are required to shift all the bits through the memory while the update must be accomplished in 10 milliseconds. The means by which information is transferred into the memory from the decoder 82 of FIG. 2 in addition to the means for accomplishing the double entry update will now be described.

Referring once more to FIG. 2 there is seen an azimuth memory 106 which is, in this embodiment, a counter capable of counting up to 256 and then reversing and counting down to zero by the following means. When azimuth memory 106 reaches the zero count terminal 106a is energized to thus set flip flop 108 to qualify gate 102. The output of gate 102 (PRF) causes the counter to count up. When the counter reaches the 255 count terminal 106b is energized to thus reset flip flop 108 thus disqualifying gate 102 and qualifying gate 104. The output from this latter gate (PRF) causes azimuth memory 106 to count down. It can thus be seen that azimuth memory continuously counts up and then counts down. The counts to be accumulated by the azimuth memory are supplied at terminal 14 at which terminal a pulse is applied each time the radar transmitter transmits. The count contained in azimuth memory 106 is fed to a digital to analog converter 110 the output of which is used to position the radar antenna. In the embodiment shown, it is assumed that the radar azimuth sweep covers 120° which is divided by azimuth memory 106 into 256 parts or 0.47° per part.

The signal $f_o/R$ from a source to be shown, at terminal 35, is applied to an inhibit terminal of gate 96. The low excursions of the $f_o/R$ signal thus qualify gate 96. A subsequent PRF signal at terminal 14 opens gate 96 so that gate 94 enters the instantaneous count contained in azimuth memory 106 into the azimuth locater 93. It will be shown that R of $f_o/R$ is equal to the total bits of storage of the main memory, that is R=16,384. Since the main memory is divided into two parts, the most significant bit from azimuth memory 106 is not applied to the azimuth locater 93. The specific use of the most significant bit will be shown later. Azimuth locater 93 is a counter having a capability of counting down from a count of 64 which is the number of words storage capacity in one-half of the main memory. When the azimuth locater reaches a zero count a signal is generated at terminal 93a which is used to clock flip flop 95. It will be noted that flip flop 95 is originally in the reset condition by reason of the signal at terminal 48.

Azimuth locater 93 receives clock pulses from gate 92 when that gate is qualified. The gate is qualified by a signal on line 90a from flip flop 90 after the low excursion of signal $f_o/R$ appears on terminal 35, from a source to be shown, and a subsequent pulse signal is applied at terminal 14. With gate 92 thus qualified, the clock pulses at terminal 48 can move therethrough to count down the azimuth locater 93 to zero at which time the output at terminal 93a is generated as previously discussed. With flip flop 95 now in the set state gate 72 becomes qualified and permits the signal $f_o$ at terminal 34 to pass therethrough and through gate 74 to strobe the integrator storage register 73. Information at these storage resisters is strobed out bit-by-bit through decoder 82.

The contents of the four registers comprising integrator storage registers 73 are shifted to decoder 82 at the same time an output from the main memory is applied to the decoder via terminal 144. The signal now arriving at terminal 144 from the main memory is the binary information which is to be replaced in the main memory by the word now being processed by the decoder and is synchronized bit-by-bit therewith. The means by which this binary data is applied from the main memory to terminal 144 will be shown below. Decoder 82 processes the information received from the integrator storage registers 73 and the information from terminal 144 as follows: (1) if four or more logical "1"s appear in any bit position, a logic "1" is generated at terminal 86 for that bit; (2) if no logic "1"s appear in any bit position, a logic "0" is generated at terminal 86 for that bit; (3) if one to three logic "1"s appear in any bit position, the logic state of the bit then appearing at terminal 144 is transferred to terminal 86 for that bit (in other words, the memory remains unchanged).

FIG. 9, reference to which should now again be made, illustrates the operation of a decoder which performs the above logic operation. Decoder 82 is seen to be comprised of OR gates 82a and 82c and AND gate 82b. The outputs of shift registers 76 and 77 are connected to the input terminals of OR gate 82c. Hence, if four or more logical "1"s appear in any bit position a logic "1" is generated by gate 82c at terminal 86. The outputs of shift registers 78 and 79 are connected to the input terminals of OR gate 82a while the output from gate 82a is connected as one input to AND gate 82b. The memory feedback at terminal 144 is connected as the second input to gate 82b. Thus, if one to three logic "1"s appear in a bit position gate 82a generates an output and gate 82b in response thereto will generate an output if the feedback bit is a logic "1." Thus, in this case the memory bit in effect remains unchanged. Of course, if no logic "1" appears in a bit position all gates remain closed and a logic "0" is entered into the main memory for that bit position.

The most significant bit of the azimuth memory 106 (FIG. 2) determines whether the data now appearing at terminal 86 is entered into the first half or the second half of the main memory. It will be noted that the most significant bit is connected directly to the input of AND gate 100 and through inverting amplifier 97 to the input of AND gate 98. If the most significant bit is a logical "1" indicating that the azimuth memory is in the second, higher half of its count, AND gate 100 is qualified and the set signal from flip flop 95 passes therethrough to terminal 113. However, if the most significant bit is a logical "0," this signal is inverted by inverting amplifier 97 to qualify AND gate 98 to allow the signal from flip flop 95 to pass therethrough and onto terminal 112.

Returning now to FIG. 3, when terminal 112 is energized, AND gate 125 is qualified while at the same time AND gate 123 is closed due to the action of inverting amplifier 120. In addition, AND gate 142 is qualified. Normally, the binary information circulating through the main memory issues from the second half of the main memory 138 onto terminal 138a and then through the normally qualified gate 123 and OR gate 126 into the first half of the main memory 130. However, now with gate 123 closed, the information issuing from main memory section 138 cannot recirculate back into the memory and the data at terminal 86 will take its place by entering the memory through now qualified gate 125 and OR gate 126. The data to be displaced, that is, the data issuing at terminal 138a, passes through now qualified gate 142 and OR gate 143 to terminal 144, where it is applied to decoder 82 of FIG. 2 for comparison with the new data as previously described. In like manner, if terminal 113 is energized, gates 134 and 140 will be qualified whereas gate 132 will be closed due to the action of inverting amplifier 121. Thus, the data issuing from the first half of the memory 130 at terminal 130a will be extinguished while new data at terminal 86 will enter the second half of the memory through gates 134 and 136. At the same time, the displaced data will pass through gates 140 and 143 to terminal 144 for use by decoder 82 of FIG. 2. Note that the information stored in the main memory is circulating at the $f_o$ rate due to the clock pulses at terminal 34. This is the same rate, of course, with which data is received at terminal 86.

Figure 4:
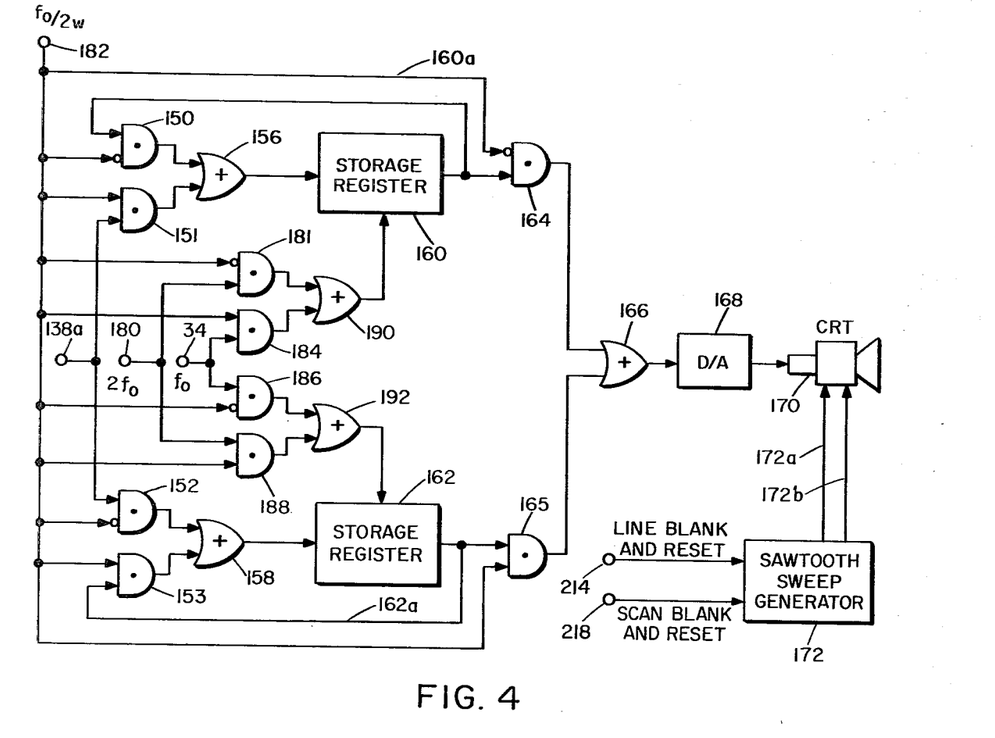
FIG. 4 is a block diagram illustrating the output section of the invention.

An output buffer connected between the main memory and the indicating device, in this embodiment a cathode ray tube, is seen in FIG. 4, reference to which should now be made. In this figure the output buffer is comprised of two storage registers, 160 and 162, each of which is capable of storing one binary word, that is, each individually has a capacity of 128 bits. It is the function of the output buffer to alternately store in one storage register a word from the main memory at the rate $f_o$ while simultaneously reading out the word previously stored in the other storage register to the cathode ray tube at a higher rate, suitably twice as fast. In other words, each word is read out twice to the cathode ray tube. In effect, the output buffer allows the entire contents of the main memory to be read out at double speed to the cathode ray tube. The output from the main memory appears at terminal 138a, which is also seen in FIG. 3, and applied as inputs to AND gates 151 and 152. There is impressed upon terminal 182 a square wave having a pulse repetition frequency at half the frequency of the square wave on terminal 48 seen earlier. That is, the signal at terminal 182 has a pulse repetition frequency equal to $f_o/2w$. The signal at terminal 182 is used to qualify gates 151, 153, 184 and 188 and is used to inhibit gates 150, 152, 181 and 186. The gates 181, 184, 186, 188, 190 and 192 are used to provide the correct clocking pulses to the storage registers. To accomplish this, the clocking pulses $f_o$ at terminal 34 are applied to gates 184 and 186 while clocking pulses at twice this rate at terminal 180 are applied to gates 181 and 188. It should be obvious that the signal at terminal 182 is high during alternate groups of 128 pulses of the clock signal $f_o$. Thus, with the signal at terminal 182 high gate 151 is open while gates 150 and 164 are closed. Thus, the data issuing from the main memory at terminal 138a enters through gate 151 and 156 into the storage register 160. At the same time, gate 184 is opened while gate 181 is closed so that the frequency signal $f_o$ from terminal 34 moves through gate 184 and 190 to strobe the storage register 160. Also, at the same time, gate 152 is inhibited while gates 153 and 165 are opened. Thus, the information in the storage register 162 is circulated via line 162a and gates 153 and 158. At the same time, the data from storage register 162 moves through gates 165 and 166 to a digital to analog converter 168. Here the digital data is converted to an analog signal to be applied to and used by the cathode ray tube 170. During this time, gate 186 is inhibited and gate 188 is opened so that the signal from terminal 180 moves therethrough and through gate 192 to clock storage register 162. Thus, as earlier explained, the word previously stored in storage register 162 is read twice into the cathode ray tube 170 in the same time that a single word is entered from terminal 138a into storage register 160. When the signal at terminal 182 goes low, the operation of the various storage registers alternates. That is, the information in storage register 160 in response to the clocking pulses $2f_o$ now circulates and additionally is read out to the cathode ray tube while the data in storage register 162 is replaced by new data from the main memory.

A sawtooth sweep generator 172 supplies two sawtooth sweeps to cathode ray tube 170. The first via line 172a is applied to the cathode ray tube range sweep and the second via line 172b is applied to the cathode ray tube azimuth sweep. A train of pulses, from a source to be described, and having a repetition frequency of $f_o/2w$, that is, at the rate words are read from the output buffer into the cathode ray tube and synchronized therewith, are applied at terminal 214 and are used to bank the range sweep return of the cathode ray tube and to reset the sweep generator range sweep signal. A second train of pulses, also from a source to be described, and having a repetition frequency of $f_o/R$, that is, at the rate the information in the main memory is completely circulated therethrough, and consequently into the cathode ray tube, is applied at terminal 218. This second train of pulses is used to blank the azimuth sweep return of the cathode ray tube and also to reset the aximuth sweep generator azimuth sweep signal.

Figure 5:
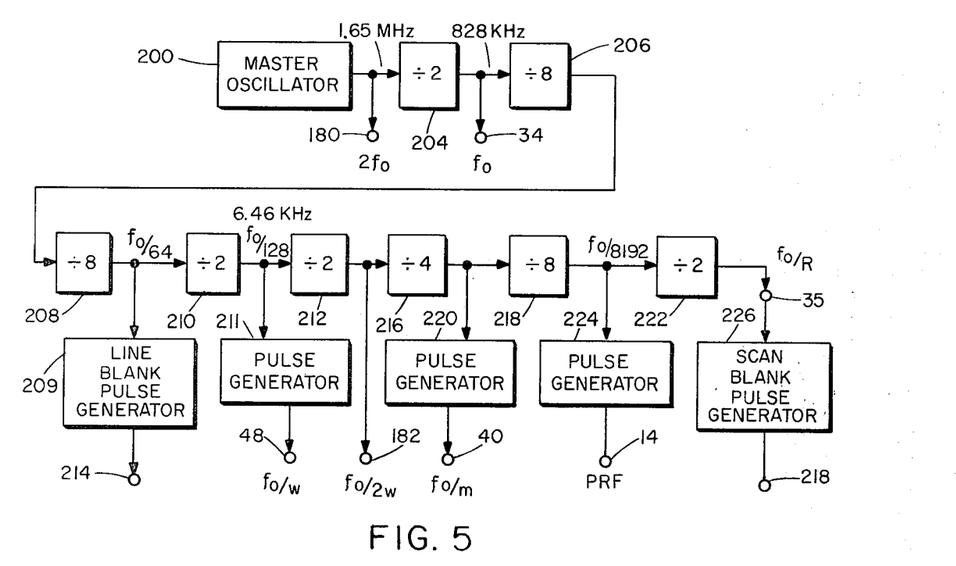
FIG. 5 is a block diagram illustrating the control signal generating means of the invention.

Refer now to FIG. 5 which shows means by which the various frequency signals mentioned above are generated. A single master oscillator 200 is provided which generates a basic frequency of 1.65 MHz for the system described in this embodiment. This frequency has been designated as the $2f_o$ frequency and appears at terminal 180. It will be remembered that this frequency is used by the output buffer of FIG. 4 to write stored digital data at twice the normal information rate onto the cathode ray tube. This frequency is divided by a divide by two divider 204 to 828 KHz which is available as the $f_o$ signal at terminal 34. This is the normal bit rate of the system and is used by the main memory and memory bank and for access into and out of these units. The $f_o$ signal is divided by 64 by the two divide by eight divders 206 and 208. A pulse generator 209 is triggered by the resultant signal once every 64 cycles of the $f_o$ signal. The pulse generator output pulse appears at terminal 214 and is used in FIG. 4 to blank and reset the range line sweep output of sawtooth sweep generator 172. The divide by 64 function is required since binary words are being written from the output buffer into the cathode ray tube at twice the normal system data rate.

The frequency signal is further divided by a divide by two divider 210 to produce a frequency signal at 6.46 KHz which is $f_o/128$. This signal triggers pulse generator 211 to generate at terminal 44 a train of pulses having a pulse repetition rate of $f_o/w$ where w is the number of bits in a binary word of the system of this embodiment.

The frequency signal is further divided by divide by two divider 212 to generate at terminal 182 a frequency signal at half the previous frequency, that is, a signal at $f_o/2w$. This signal is used in FIG. 4, as previously described, to alternately permit the output buffer to store therein a word from the main memory and to simultaneously supply a previously stored word to the cathode ray tube.

The frequency signal is further divided down by a divide by four divider 216, the output of the divider being used to trigger pulse generator 220. The resultant train of pulses is generated at terminal 40. These pulses have a pulse repetition frequency of $f_o/m$ where m is the number of bits in memory bank 26 of FIG. 1. Hence, a pulse appears at terminal 40 each time the data in memory bank 26 has completely circulated therein.

The frequency signal is again divided down by a divide by eight divider 218 to generate a signal at $f_o/8,192$. This signal triggers pulse generator 224 to generate a train of pulses at terminal 14. This train of pulses has previously been designated PRF and is used by the system as previously described and also to trigger the transmitter of an associated radar.

The frequency signal is again divided in half by divide by two counter 222 to generate at terminal 35 a signal designated $f_o/R$ where R is the number of bits storage of the main memory. Hence, the information stored in the main memory is completely circulated therethrough once each period of the signal at terminal 35. This signal is also used to trigger the pulse generator 226 to the output of which appears at terminal 218 and is used by the sawtooth sweep generator 172 of FIG. 4 to blank and reset the cathode ray tube azimuth sweep.

Figure 6:
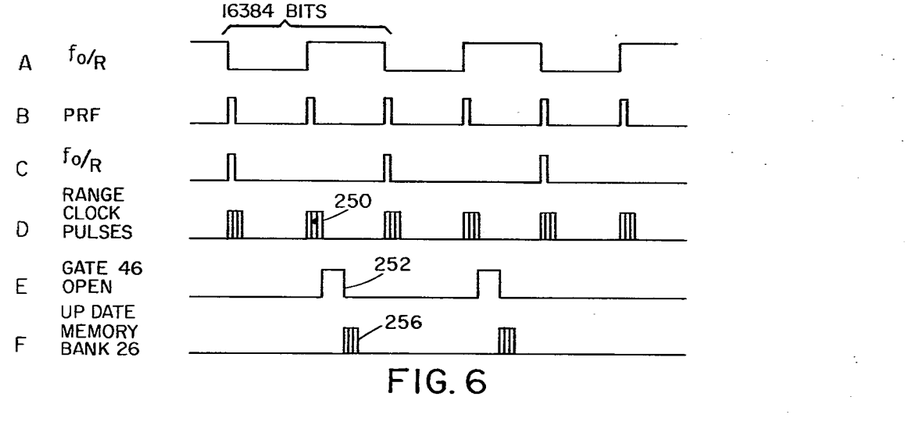
FIGS. 6, 7 and 8 are timing diagrams which are helpful in explaining the operation of the invention.

FIG. 6 shows various timing diagrams which are useful in explaining the sequencing of operations in this embodiment of the invention, and reference should now be made to this figure together with the other figures as required. On line A there is seen the square wave $f_o/R$ where R is the bit storage capacity of the main memory. This signal appears at terminal 35 and one period of the signal contains 16,384 cycles of the $f_o$ signal. In other words, since the main memory is clocked by the $f_o$ signal and hence has an informational rate equal to $f_o$, 16,384 bits pass through the main memory during one cycle of the signal shown on line A.

Line B shows the PRF signals generated at terminal 14 and which occur at each transition of the signal shown on line A. It will be remembered that the PRF signals are sychronized with the radar transmissions and are used in FIG. 1 to reset the video counter so that a word of data may be entered into the input buffer. At line D of FIG. 6 there is seen the range clock pulses which it will be remembered with respect to FIG. 1 are used for entering the digitized video into the input buffer. It will be remembered that the rate at which the range clock pulses are generated is determined by the desired range of the radar. In the embodiment described where a binary word contained 128 bits it will be remembered that for a hundred mile range a bit rate of 106 KHz is required. Of course, each bundle of range clock pulses shown, for example, bundle 250, contains 128 range clock pulses.

Line F of FIG. 6 shows the clock pulses which are used to enter the information from the input buffer into the memory bank. It will be remembered that these clock pulses occur at the $f_o$ rate and that 256 of these pulses are required to enter the two words from the input buffer into the memory bank. Thus, each pulse bundle, for example, bundle 256 contains 256 pulses at the $f_o$ rate. Each group of these pulses occurs after alternate groups of pulses shown on line D and require considerably less time for each group of pulses than the time between consecutive bundles at line D.

Line E of FIG. 6 shows the time during which gate 46 of FIG. 1 is open, that is, the time within which clock pulses are applied to the down counter 42 of FIG. 1. It should now be clear that down counter 42 maintains the information circulating in the memory bank in synchronism with the information entering therein from the input buffer. It should also be clear that the information contained in the address counter 40 of FIG. 1 is entered into the down counter 42 immediately after the completion of each alternate group of range clock pulses, for example, pulses 250 and that when the down counter is counted to zero as at transition time 252 of line E, the contents of the input buffer is entered into the memory bank.

Line C shows the train of pulses at the repetition frequency $f_o/R$ which are generated by pulse generator 226 of FIG. 5 and which are used to blank and reset the azimuth sweep of the cathode ray tube as previously described with respect to FIG. 4.

Figure 7:
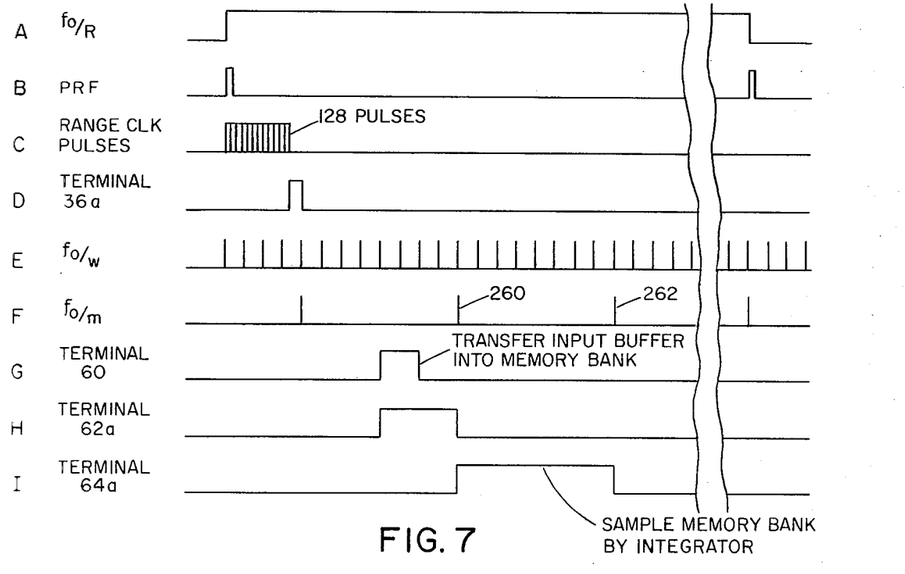

FIG. 7 shows various of the timing diagrams of FIG. 6 greatly enlearged and reference should now be made to this figure together with FIGS. 1 and 2. At lines A, B, and C of FIG. 7 are seen respectively the $f_o/R$ signal, PRF signal, and the range clock pulses. At line D the output from flip flop 36 which appears at terminal 36a is seen. At line E are seen the $f_o/w$ signals which are generated at terminal 48 of FIG. 5. It will be remembered that these signals occur once every 128 cycles of frequency $f_o$. At line F are seen the $f_o/m$ signals which are generated at terminal 40. These pulses are generated once for every eight of the pulses in the signal at line E. Since there are 128 bits in a word and the capacity of the memory bank is eight words, the pulses at line E are synchronized with the end of a word at the rate $f_o$ while the pulses at line F are synchronized with bits circulating in the memory bank at the rate $f_o$. More particularly, a pulse as shown at line F is generated each time the information stored in the memory bank has been completely circulated therethrough. Returning to FIGS. 1 and 7, the signal at terminal 36a qualifies gate 38 which is opened by a subsequent signal at terminal 40 ($f_o/m$). The opening of this gate resets flip flop 36 thus extinguishing the signal at terminal 36a and simultaneously enters the instantaneous contents of the address counter 40 into the down counter 42. For the purposes of this explanation, it is assumed that the number 4 is entered into the down counter. The down counter now accumulates pulses from terminal 48, that is the pulses at frequency $f_o/w$ as seen on line E of FIG. 7. After four of these pulses the down counter reaches zero and its resultant output signal triggers flip flop 50 to generate an output at terminal 60 as seen at line G. During this time that terminal 60 is energized gate 28 is opened to permit the input buffer to empty into the memory bank. Terminal 60 remains energized for two subsequent pulses from the signal shown at line E. At the same time terminal 60 is energized it can be seen in FIG. 2 that flip flop 62 is triggered so to energize terminal 62a as also seen at line H. Since terminal 62a is connected to the set terminal of flip flop 64 and the toggle terminal of this latter flip flop is connected to terminal 40, that is, the terminal upon which the $f_o/m$ signal of line F is connected, a subsequent pulse of the signal shown on line F, for example, pulse 262, causes flip-flop 64 to toggle, thus extinguishing the signal at terminal 64a. This is exactly the time required for the entire contents of the memory bank to be sampled by the integrator. It can thus be seen that at alternate transmissions of the radar transmitter two words are added into the memory bank, each word being the result of a transmission, and in addition the eight words contained in the memory bank are sampled by the integrator and that the various operations are synchronized with one another.

It should be obvious that if address counter 40 contains fewer or more counts than the postulated four counts, the signal at line G of FIG. 7 would move bodily either to the left or right respectively while the signal shown at line I would remain constant and leading edge of the signal at line H would move to coincide with the leading edge of the signal at line G, and its trailing edge will remain the same.

Figure 8:
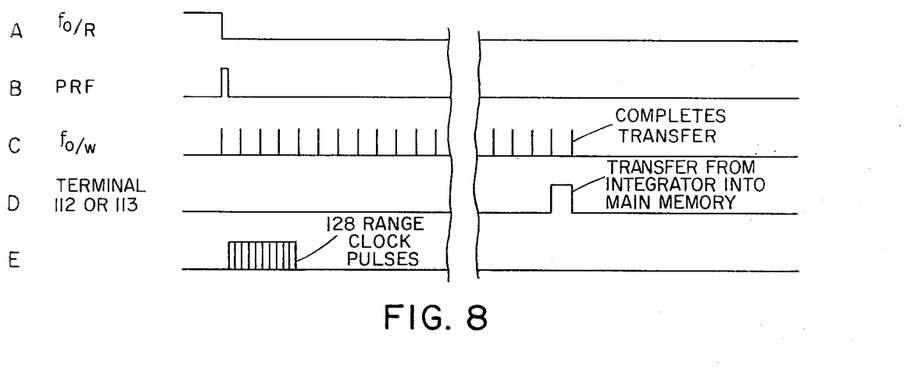

FIG. 8 is a timing diagram which is useful in explaining how the contents of the integrator are entered into the main memory and reference should now be made to that figure together with FIGS. 2 and 3. At line A of FIG. 8 there is seen the $f_o/R$ signal while at line B is seen the PRF signal and at line C is seen the $f_o/w$ signal. With the $f_o/R$ signal in the down state a PRF signal triggers flip flop 90 to qualify gate 92 and additionally energizes the set terminal of flip flop 95. At the same time the PRF signal acting through gate 96 and gate 94 samples the contents of azimuth memory 106 into the azimuth locater 93. Thus, a number related to the location of the radar antenna is now entered into the azimuth locater 93. In addition, the information now stored in the integrator storage registers 73 is the information received from the antenna while generally at that azimuth position. It will be remembered that integration is performed on eight words and the input into the main memory is the result of this integration. It is desirable that the input into the main memory be the result of integration of words resulting from transmissions on both sides of the azimuth corresponding to the number in the azimuth memory. This can be accomplished by having the antenna lead the azimuth memory. The azimuth locater is clocked down by the $f_o/w$ signal shown at line C. When the azimuth locater reaches zero either terminal 112 or 113 is energized depending upon the instantaneous state of the most significant bit of the azimuth memory 106. As previously described, with either terminal 112 or 113 energized, the contents of the integrator are transferred into the main memory. Thus, reviewing the operation of the indicator with respect to FIGS. 7 and 8, it should now be understood that during the first half cycle of the $f_o/R$ signal the contents of the input buffer are transferred into the memory bank and in addition the memory bank is sampled by the integrator, while during the second half cycle of the $f_o/R$ signal the contents of the integrator are transferred into the main memory. Each of these operations is synchronized with one another through the means of FIG. 5 so that there is contained in the main memory complete information as to the total radar scan and in ordered sequence. This information is now retrieved and displayed on a cathode ray tube through the output buffer as has previously been adequately described.

The invention claimed is:

1. A digital data display system for displaying digital data bursts comprised of digitized data comprising:
   an input buffer for storing a predetermined number of said digital data bursts in response to a first train of clock pulses;
   means for generating said first train of clock pulses;
   an electronic circulating memory for storing digitized data in response to a second train of clock pulses and for entering digitized data for storage therein when the digitized data to be entered is communicated to said circulating memory;
   a master oscillator for generating a plurality of coherent control signals including said second train of clock pulses;
   first gate means responsive to said control signals for communicating the digitized data stored in said input buffer to said circulating memory;
   an output buffer for storing digitized data communicated thereto;
   second gate means responsive to said control signals for communicating digitized data stored in said circulating memory to said output buffer; and,
   display means responsive to digitized data applied thereto for displaying the data so applied, said second gate means being further responsive to said control signals for applying digitized data previously stored in said output buffer to said display means.

2. The digital data display system of claim 1 wherein said input and output buffers comprise first and second shift registers.

3. A digital display system as recited in claim 1 wherein said digital data bursts are generated in response to said control signals and wherein said means for generating said first train of clock pulses includes means for varying the pulse repetition frequency of said first train of clock pulses.

4. A digital data display system as recited in claim 1 with additionally a data integrator connected in said first gate means between said input buffer and said circulating memory for integrating the digitized data communicated from said input buffer to said circulating memory, the integrated digitized data comprising the data entered into said circulating memory for storage therein.

5. A digital display system for use with a radar which generates digital data bursts in serial format comprising:
   means for reducing each data burst to a word comprised of a predetermined number of digital bits;
   first means for storing a predetermined number of said words as generated;
   a circulating electronic memory for storing a plurality of digital words;
   master oscillator means for generating a plurality of coherent control signals;

means responsive to said control signals for altering the words in said circulating memory in accordance with the words stored in said first means;

means for displaying digital data applied thereto;

second means having digital words stored therein and responsive to said control signals for altering said digital words stored therein in accordance with the words in said circulating memory and subsequently applying said digital words so altered to said display means.

6. The display system of claim 5 wherein said second means comprises first and second further memories, said second means being responsive to said control signals for entering a digital word from said circulating memory into said first further memory at a first data rate whereby the word previously stored in said first further memory is altered to become the word entered from said circulating memory and simultaneously applying a digital word previously stored in said second further memory to said display means at a second data rate.

7. The digital display device of claim 6 wherein said second data rate is a whole multiple of said first data rate.

8. A display device for a radar including a transmitter and receiver comprising:

master oscillator means including a plurality of digital counters for generating a plurality of coherent control signals, said transmitter being responsive to at least a first of said signals for transmitting a radar signal whereby radar return signals are produced for interception by said receiver, said receiver including means for digitizing said return signals;

a digital input means having a capacity to store a predetermined number of digital bits;

circulating memory means;

first gate means responsive to said control signals for communicating a digitized radar return signal to said input means during a first period whereby said digitized radar return signal is stored therein in a bit-by-bit manner, and for communicating said input means to said circulating memory means during a second period whereby a digitized radar return signal previously stored in said digital input means is stored in said circulating memory means;

output means;

utilization means responsive to said control signals for displaying digitized data applied thereto and, second gate means responsive to said control signals for communicating said circulating memory means to said output means whereby digitized radar return signals are stored in said output means and for applying a digitized radar return signal stored in said output means to said utilization means, the digitized radar return signal applied to said utilization means comprising said digitized data.

9. The display device of claim 8 wherein said digital input means comprises a digital shift register and wherein said predetermined number of digital bits is an integral multiple of a second predetermined number of digital bits, said first gate means being responsive to enter into said digital input buffer means said second predetermined number of bits in a serial by bit manner from each digitized radar return signal.

10. The display device of claim 9 wherein the storage capacity of said circulating memory means is an integral multiple of said second predetermined number.

11. The display device of claim 10 wherein said master oscillator means includes means for generating first clock pulses at a first pulse repetition frequency, said first clock pulses being applied directly to said circulating memory means to thereby circulate digital information stored therein at an information rate related to said first pulse repetition frequency, said first gate means being responsive to apply said first clock pulses to said input means during said second period whereby said digitized radar return signal previously stored in said input means is stored in said circulating memory means.

12. The display device of claim 11 wherein said first gate means includes means for generating a second train of clock pulses at a second pulse repetition frequency, said first gate means being responsive during said first period for applying said second pulse train to said input means whereby said digitized radar return signal is entered and stored in said input means.

13. The display device of claim 12 wherein said first gate means includes means for terminating said first period after a number of said second clock pulses have been applied to said input means said number of second clock pulses being equal to said second predetermined number.

14. The display device of claim 13 wherein said second pulse repetition frequency is selectively variable.

15. The display device of claim 8 wherein said master oscillator means includes means for generating first clock pulses at a first pulse repetition frequency, said first clock pulses applied continuously to said circulating memory means whereby digitized radar return signals stored therein are circulated at an information rate related to said first pulse repetition frequency, and wherein said second gate means is responsive to said control signals for applying said first clock pulses to said output means whereby digitized data is entered from said memory means into said output means.

16. The display device of claim 8 wherein said output means comprises first and second further memories, said second gate means being responsive to said control signals for communicating said circulating memory means with one of said further memories during a third period and for communicating the other of said further circulating memories with said utilization means during said third period.

17. The display device of claim 16 wherein said second gate means responds further to said control signals for communicating said circulating memory means with said second further memory during a fourth period and for communicating said first further memory with said utilization means during said fourth period.

18. The display device of claim 17 wherein said master oscillator means includes means for generating a third train of clock pulses at a third pulse repetition frequency, said third pulse repetition frequency being an integral multiple of said first pulse repetition frequency, and wherein said second gate means is responsive to said control signals to apply said first clock pulses to one of said further memories when said further memory is communicating with said circulating memory means and for applying said third clock pulses to said one of said further memories when that further memory is communicating with said utilization means.

19. In a display apparatus for a radar having an antenna means wherein transmissions are radiated from said antenna means in a direction related to the state of said antenna means, radar return signals resulting from said transmissions, an improvement comprising:

digital counting means having a count correlated to the state of said antenna means;

means for generating a first train of clock pulses;

binary data storage means responsive to said first train of clock pulses for storing a predetermined number of said radar return signals in binary format, each said radar return signal thereby comprising a binary word of a predetermined number of binary bits;

means for generating a plurality of coherent control signals including at least a second train of clock pulses and a third train of clock pulses having a pulse repetition frequency which is an integral multiple of the pulse repetition frequency of said second train of clock pulses, the radar transmissions being related to said control signals;

a circulating memory containing a predetermined number of binary words, each of a predetermined number of binary bits and each word being related to at least one previous radar return signal, said binary bits being circulated within said memory in response to said second train of clock pulses;

means responsive to said control signals and said count in said digital counting means for altering at least one word circulating in said memory in accordance with at least the words in said binary data storage means;

utilization means for displaying binary words applied thereto; and, means responsive to said control signals including said second pulse train for extracting predetermined words from said circulating memory at a rate related to the pulse repetition frequency of said second pulse train and responsive to said control signals including said third pulse train for applying extracted words to said utilization means at a rate related to the pulse repetition frequency of said third pulse train.

20. The improvement of claim 19 wherein said binary data storage means includes an integrator means responsive to said at least predetermined number of radar return signals for generating an integrated radar return signal whereby said means for altering alters said at least one word circulating in said memory in accordance with at least said integrated radar return signal.

21. The improvement of claim 19 wherein said binary data storage means comprises a further circulating memory and gate means responsive to said control signals for entering a current radar return signal into said further circulating memory for storage therein while simultaneously removing an earlier stored radar return signal from said further circulating memory whereby said memory is updated.

* * * * *